June 26, 1962 — W. R. BROWN — 3,040,540
ICE CREAM MACHINE
Filed Oct. 29, 1959 — 3 Sheets-Sheet 1

INVENTOR.
WALTER R. BROWN
BY
THEIR ATTORNEYS

INVENTOR.
WALTER R. BROWN
BY
THEIR ATTORNEYS

June 26, 1962 W. R. BROWN 3,040,540
ICE CREAM MACHINE
Filed Oct. 29, 1959 3 Sheets-Sheet 3

INVENTOR.
WALTER R. BROWN
BY
THEIR ATTORNEYS

3,040,540
ICE CREAM MACHINE
Walter R. Brown, 706 Sylvan Ave., Pittsburgh 2, Pa.
Filed Oct. 29, 1959, Ser. No. 849,485
11 Claims. (Cl. 62—132)

This invention relates to a machine for making and delivering "soft ice cream" to meet the sales requirements of individual customers.

A particular object of the invention is to provide a machine of this type which is very compact and efficient in operation, and which has a minimum number of parts so that it can be easily taken apart and sterilized.

A special feature of the machine resides in the simplified dasher construction which has a single removable scraper blade, and which can be easily disassembled for cleaning. The parts are interfitted in such a manner that the scraper blade can be replaced in only one position, the correct one. The blade carries directional vanes which push the ice cream toward the discharge gate.

Another feature of novelty is found in the discharge head and gate. This head and gate is a simplified structure formed of clear plastic, which permits the customer to see the ice cream from the time it leaves the dasher until it drops into the cone or dish in which it is delivered to him. At the same time this plastic head and gate assembly, together with a plastic mounting ring, insulate the front end of the machine so as to conserve refrigeration and prevent frosting, thus preserving a clean appearance and obviating unsightly dripping.

These, and other objects and advantages of the invention will become apparent as the description proceeds.

Figure 1:
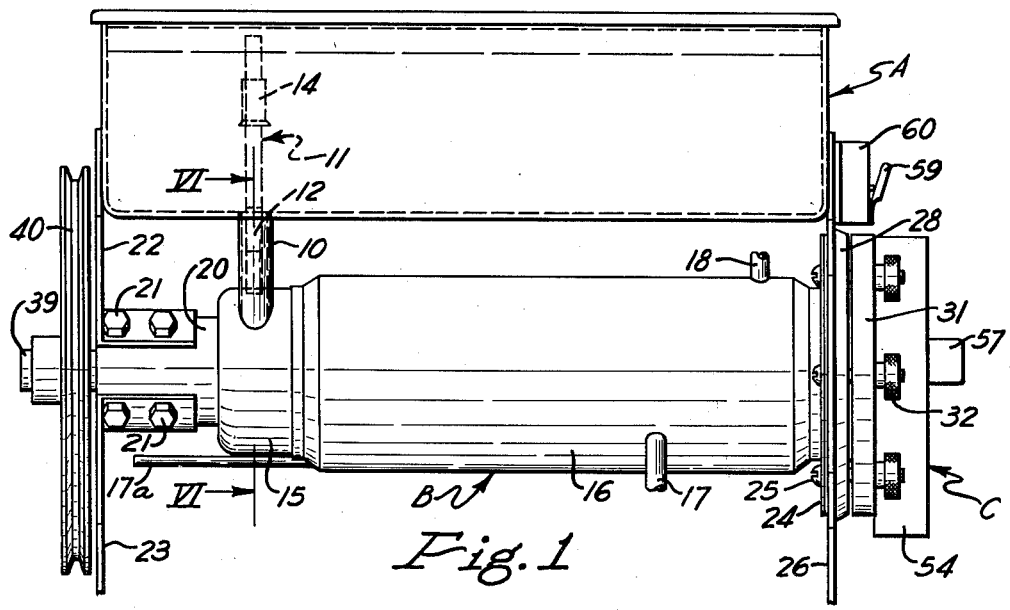
FIG. 1 is a side elevation of an ice cream machine incorporating the features of the present invention.
Figure 2:
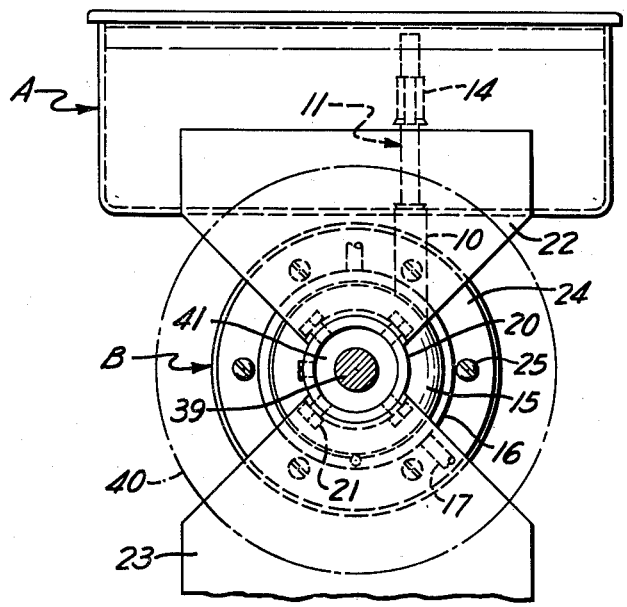
FIG. 2 is a rear elevation looking at FIG. 1 from the left.

Referring to the drawings in greater detail, the machine comprises a mix tank A, a freezing assembly B, and a discharge assembly C.

A supply line 10 (see FIGS. 1 and 6) conducts the mix from the mix tank A to the freezing assembly B. A mix feed-valve 11 has a control head 12 which controls the amount of mix passing to the freezing assembly, and a tubular passage 13 through the valve 11 admits air. The valve 11 has two control heads, 12 and 14, which admit different amounts of mix in proportion to air, but since this control valve is being made the subject of a separate patent application it will not be described here in detail.

After the mix passes through the supply line 10 it enters the freezing assembly B, where it is frozen and mixed with air in a manner now to be explained. The construction of the freezing assembly is shown especially in FIGS. 1, 3, 6 and 7.

*Freezing Assembly*

The freezing assembly B comprises a freezing cylinder 15 and a jacket 16. The jacket 16 has its opposite ends brazed or otherwise secured to the cylinder 15 so as to provide a refrigerant jacket surrounding cylinder 15. A tube 17 delivers liquid refrigerant to the jacket, and the gaseous refrigerant is withdrawn by way of the outlet 18 in a manner well understood in the art. A tube 17a extends into the jacket 16 and accepts a thermostat feeler which controls the temperature of the freezing cylinder.

At its rear end the freezing cylinder 15 is closed except for a cylindrical opening 19 large enough to admit a bearing portion formed on the shaft of the dasher. On the outside of the rear end, and surrounding the opening 19 is secured a hub 20, which may be brazed or welded to the freezing cylinder.

The hub 20 is attached by set screws 21 to a frame member 22 which carries the mix tank A, and by similar screws 21 to a frame member 23 which extends downwardly to a suitable support. These parts form a solid support for the rear end of the freezing cylinder 15.

*Front End Mounting of Freezing Cylinder*

At its front end the freezing cylinder 15 carries an outwardly projecting flange 24, which may be attached to the cylinder by welding, brazing, or any preferred method. The flange 24 is attached to the frame of the machine in a manner shown generally in FIG. 3 and in greater detail in FIG. 5. This attachment consists essentially of bolts 25 which secure the flange 24 to the frame member 26. A polyethylene washer 27 is interposed between the frame member 26 and the flange 24.

After projecting through the frame member 26, the bolts 25 extend through a head ring 28, which is preferably formed of blue plastic. Nuts 29 are recessed into the ring 28, and engage the bolts 25 to hold the head ring 28, frame member 26, and flange 24 in secure engagement.

The circular opening in the head ring 28 is slightly larger than the end of the freezing cylinder 15, so that the ring 28 does not directly contact the cylinder.

The forward end of the freezing cylinder 15 projects beyond the head ring 28 and fits closely in a circular groove 30 formed in the circular head plate 31. The bolts 25 project through holes in the head plate 31, and knurled thumb nuts 32 engage over the outer ends of these bolts to firmly clamp the head plate 31 against the projecting end of the freezing cylinder 15. The head plate 31 is preferably made of clear plastic, and this firm engagement of the plastic head plate with the end of the freezing cylinder avoids the necessity for using a gasket or washer to seal this joint.

Figure 3:
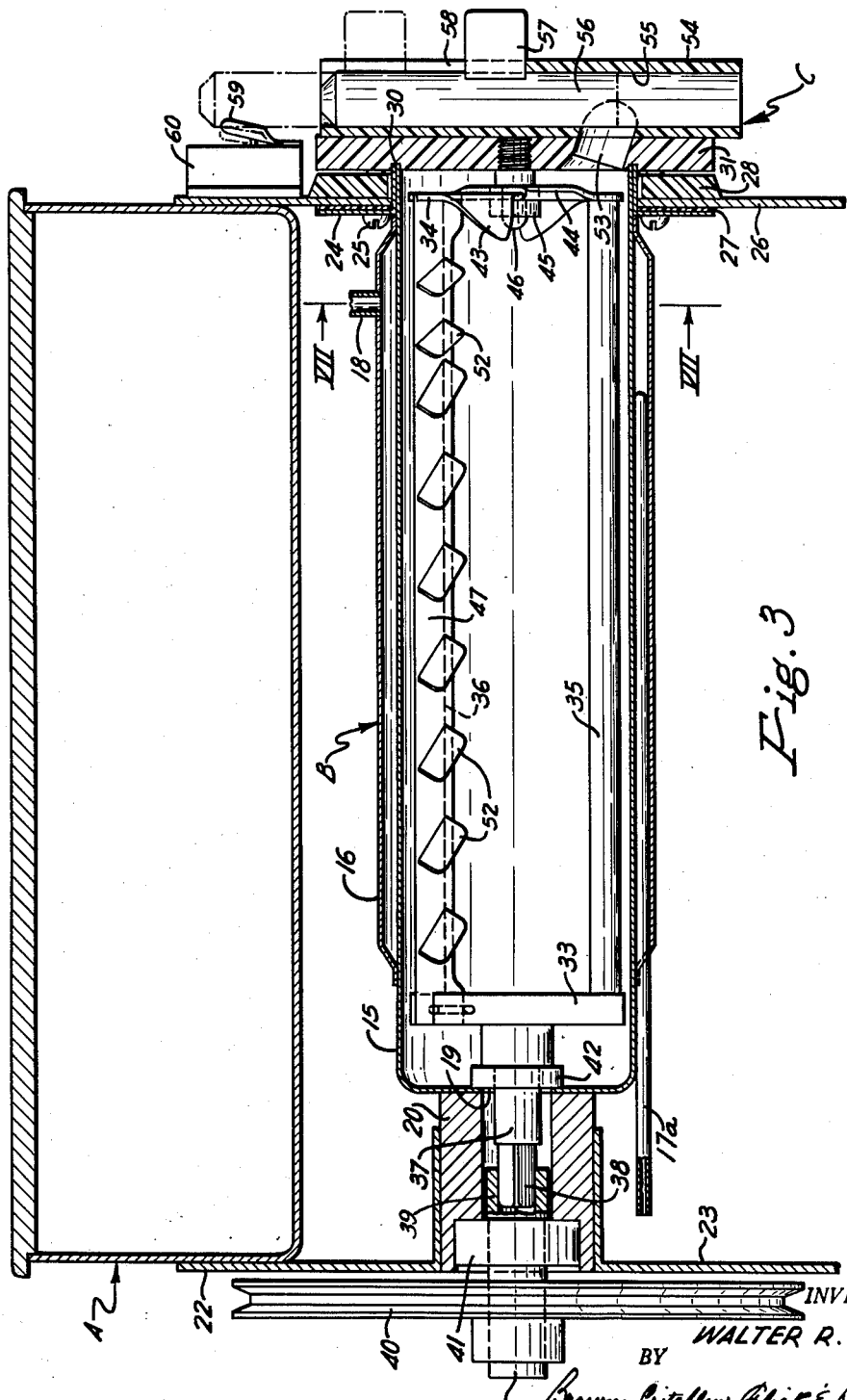
FIG. 3 is a longitudinal section, with some parts in elevation, of the device of FIG. 1.
Figure 5:
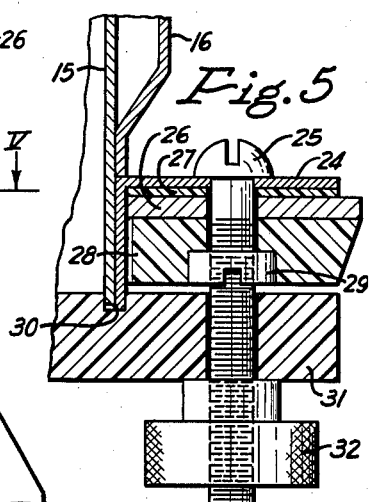
FIG. 5 is a section on line V—V of FIG. 4.

It will be seen, especially in FIGS. 3 and 5, that the head plate 31 is spaced from the head ring 28, and that its contact with cold parts of the machine is limited to a small area at the end of the freezing cylinder 15. This construction helps to insulate the head plate 31 and prevent frost forming on it, as will presently be explained.

*Rotatable Dasher Assembly*

Figures 6, 7, 8:
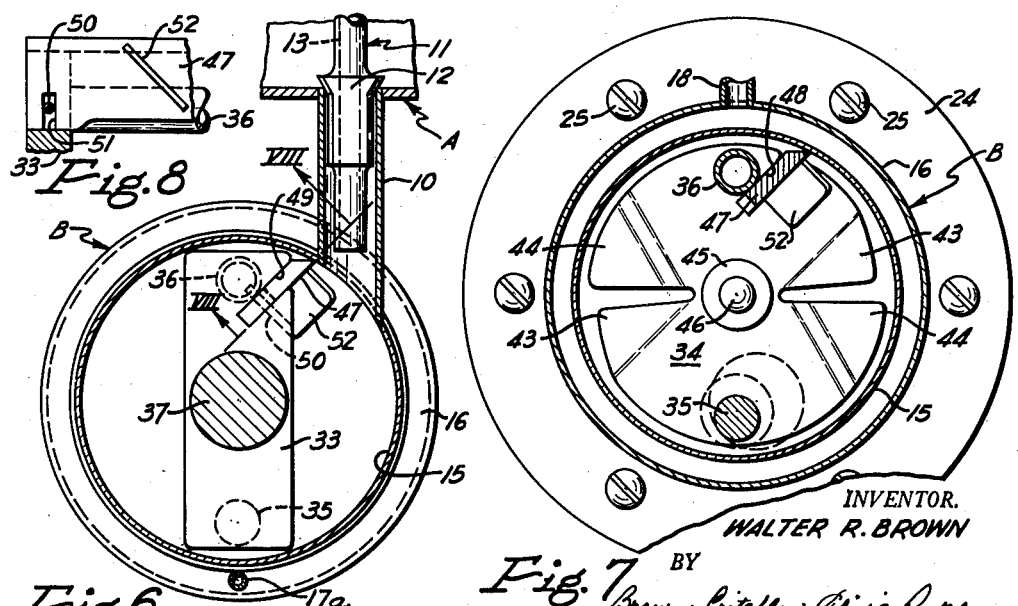
FIG. 6 is a section on line VI—VI of FIG. 1.
FIG. 7 is a section on line VII—VII of FIG. 3.
FIG. 8 is a section on line VIII—VIII of FIG. 6.

The rotatable dasher which beats and whips the ice cream is shown in side elevation in FIG. 3, in end elevation in FIG. 6, and in cross-section in FIG. 7.

This dasher includes a solid, rectangular end piece 33 at its inner end, and a discharge disc 34 at its outer end. These two end pieces are connected together by two round connecting members. One of these connecting members, 35, shown at the bottom position in FIGS. 3, 6 and 7, is a solid rod. The other connecting member, 36, shown at the top position in FIGS. 3, 6 and 7, is a tubular member, for a purpose which will be explained presently. The connecting members 35 and 36 are welded to the end pieces 33 and 34 to form a strong and rigid assembly.

A stud shaft 37 projects from the end of the rectangular end piece 33 and has a squared end 38 which engages in a socket formed in the drive shaft 39 which is rotated by pulley 40. The drive shaft 39 is carried in a ball bearing 41, and a seal 42 seals the joint between the stud shaft 37 and the freezing cylinder 15.

The discharge disc 34 (see FIGS. 3 and 7) at the forward end of the dasher, is formed with a pair of sector-shaped wings 43 which are bent inwardly and have their edges facing in the direction in which the dasher rotates. These wings form a discharge screw which forces the ice cream into the discharge opening of the freezer.

Just across the slots which define the wings 43, the disc 34 is bent slightly outwardly to form pressure plates 44. These pressure plates further press and compact the ice cream as it moves toward the discharge opening. By varying the position of these plates 44 it is possible to vary the firmness of the ice cream produced by the machine.

The discharge disc also carries a hollow bearing sleeve 45, which is adapted to fit over a stud 46 which is screwed into the head plate 31.

The parts that have been just described as forming the dasher are all formed of stainless steel, welded together, so as to form a strong and rigid unit which is easy to remove from the machine for cleaning and sterilizing.

Another, but separate element, of the dasher assembly, is the scraper blade 47, seen in FIGS. 3, 6 and 7. This blade is of generally rectangular cross-section, as seen in FIG. 7, and its outer end fits into a slot 48 of appropriate shape formed in the discharged disc 34. A similar slot 49 is formed in the rectangular end piece 33, and slot 49 has a pin 50 anchored across its width. The end of the scraper blade 47 is formed with a slot 51 which fits over pin 50, as seen especially in FIG. 8. The result of this construction is that the scraper blade 47 can be mounted on the dasher assembly in only one position, the correct one, thus avoiding damage that might result from attempting to operate the machine with the scraper blade in a wrong position.

A series of directional vanes 52 is mounted on the scraper blade, and these vanes are sloped in such a position that as the dasher assembly is rotated (the upper part in FIG. 3 moving toward the viewer) these vanes act as segmental screws to push the paratially frozen ice cream toward the discharge gate. These vanes are in effect sections of a helix, but they avoid the necessity of using a complete helix or other complicated device for moving the product toward the discharge end of the freezing cylinder.

These vanes 52 are mounted so as to obtain maximum pushing effect, since they are located so as to contact the frozen product as it is being scraped from the wall of the freezing cylinder by the scraper blade.

The vanes 52 may all be pitched at the same angle, or if higher ejection pressures are needed, as with an extremely hard frozen product, those vanes nearest the discharge end may be pitched more sharply, as illustrated in FIG. 3. Such variations in pitch may also be designed into the machine to give varying amounts of "over-run" (air in the finished product). Greater pressure squeezes air from the product and thus reduces "over-run."

It will be noted from FIGS. 6 and 7 that the outer edge of scraper blade 47 is beveled away from the direction of rotation, and that the blade is disposed at a more acute angle to the circumference than if it were on a radius. The purpose of this construction is to provide a sharp scraping edge to scrape the frozen product from the inner wall of the freezing cylinder. It will be seen that the scraper blade is not rigidly attached to the dasher assembly, but is free to move outwardly under the influence of centrifugal force into contact with the wall of the freezing cylinder.

The scraper blade 47 is preferably made of German silver, which is softer than the stainless steel of the cylinder wall. As a result most of the wear takes place on the scraper blade, which can readily be replaced, thus prolonging the life of the more expensive cylinder.

It will be clear from FIGS. 6 and 7 that the scraper blade 47 is located closely adjacent to the tubular rod 36. In this way the lighter-weight rod 36 plus the scraper blade are balanced by the heavier solid rod 35 on the opposite side of the axis, thus producing a balanced rotatable assembly, with maximum simplicity of structure.

Discharge Gate and Head Assembly

It will be clear from the previous description that the mix is frozen on the wall of the freezing cylinder, and is scraped from the wall and forced toward the discharge end by the dasher assembly.

Figure 4:
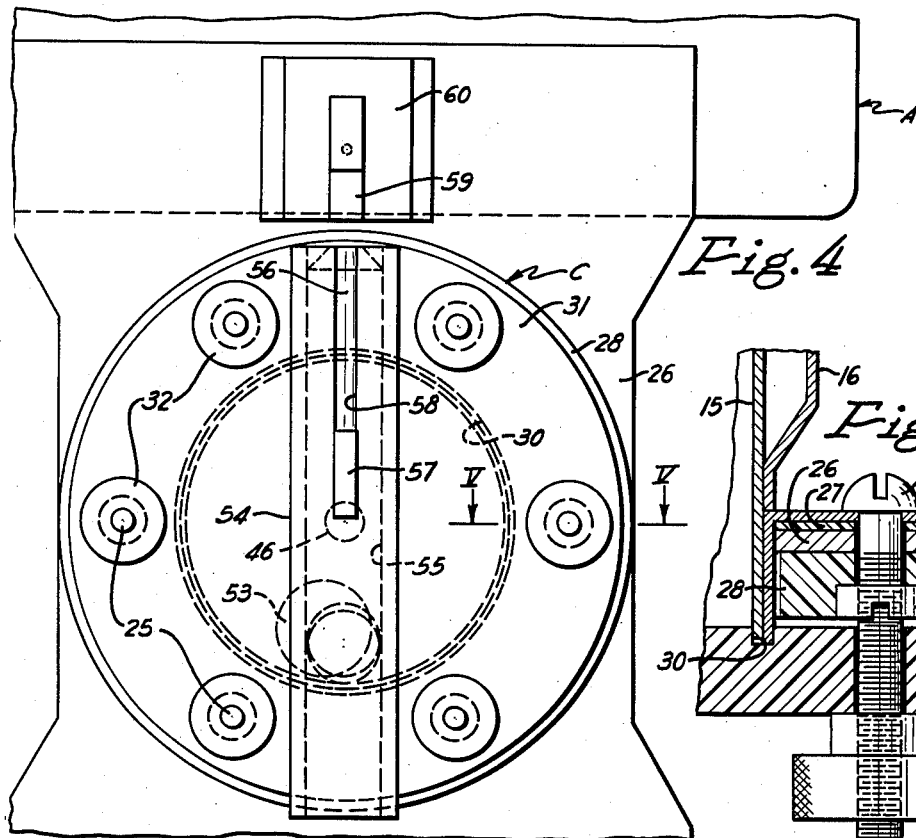
FIG. 4 is a partial front elevation of the machine.

The head plate 31, previously described as being attached to the front end of the freezing cylinder 15, is formed with a discharge port 53 (FIGS. 3 and 4). This discharge port is located at the bottom of the circumference of the freezing cylinder, and as it passes through plate 31, is inclined in the direction in which the dasher assembly is rotated. This inclination facilitates entry of the frozen ice cream into the discharge port.

The discharge gate includes a casing, which may be a square column 54 of plastic permanently secured to the head plate 31. A vertical cylindrical bore 55 is formed in the column 54, and a cylindrical plunger 56 fits closely in the bore 55. The discharge port 53 communicates with the bore 55 so as to permit the frozen ice cream to escape via discharge port 53 and the lower part of bore 55 when the gate is open.

The plunger 56 not only fits closely in bore 55, but is of substantially the same length as the bore. A handle 57 projects outwardly from the plunger 56, and slides in slot 58 in column 54, the slot being open at the top of the column.

The parts are so proportioned that when the plunger is in its position at the lower end of the slot, the lower end of the plunger is substantially at the level of the lower end of the column 54.

The upper end of the plunger 56 is tapered into a frusto-conical shape, and the trip arm 59 of an electrical switch 60 is so placed that it will be tripped when the plunger is moved to its upper position, as shown in the dot-dash lines of FIG. 3. The switch 60 controls electric current to a motor (not shown) which actuates the pulley 40 and thus rotates the dasher assembly.

The entire discharge gate and head assembly, including the head plate 31, the column 54, and the plunger 56, is preferably made of clear plastic, such as "Lucite" (trademark). The advantages of using this type of material will be explained later herein.

Operation

When it is desired to deliver ice cream to a customer, the operator lifts up on handle 57, thus opening the discharge gate and tripping switch 60 to start the machine. When sufficient ice cream has been delivered, the operator merely moves handle 57 down, thus stopping the machine and closing the gate.

Disassembly and Cleaning

After the machine has been in use for a period of time and it is desired to clean the machine, the matter of disassembly is relatively easy. After removing the thumbnuts 32 the head plate 31 can be taken off, and the dasher can then be pulled out from the socket in shaft 39. The plunger 56 is slipped from its bore. These few parts are relatively small, and they can all be placed in a small vessel for sterilization. Meanwhile, easy access has been provided to the interior of the freezing cylinder.

After sterilization the parts can readily be assembled without the aid of an expert mechanic. As previously explained, the scraper blade can be assembled in only the correct position, and the manner of assembling the other parts is quite obvious.

Advantages

The improved ice cream machine of the present invention has a number of advantages:

(1) *It is simple and compact.*—Due to its simplicity in design and efficiency it can be made very small for a given output.

(2) *Ease of assembly and disassembly.*—The parts can readily be removed for cleaning and sterilization. There are a minimum number of parts to re-assemble and correct assembly is positively assured.

(3) *Attractive appearance.*—The use of clear plastic for the face plate permits the customer to see the ice cream being delivered through the delivery gate. Since the plastic is a good heat insulator, and the face plate has little direct contact with cold parts of the machine, the front of the discharge gate and head assembly do not become frosted over and there is no unsightly dripping of melted frost.

The plastic head ring helps to provide heat insulation for the face plate to further reduce the chance of frost developing on the outside of the face plate. Also, by making the head ring of blue plastic, the blue can be seen through the face plate, thus giving an appearance of bluish cold to the front of the machine.

(4) *Conservation of refrigeration.*—The good heat-insulating properties of the plastic used for the head plate and the head ring serve to conserve refrigeration, thus increasing the capacity of the freezer. Also, by maintaining an even cold at the front of the freezing cylinder, no opportunity is given for a portion of the product to partially melt, making it necessary to discard this portion of the output, as in prior machines.

(5) *Simplified switch operation.*—Because of the electrical insulating properties of the plastic, it is possible to simplify the operation of the electrical switch by having the plunger of the valve directly engage the trip arm of the switch.

(6) *Elimination of drippage at the valve.*—The plunger of the gate valve has a long bearing area in its bore, with the result that undue wear, with attendant leakage, is eliminated. Also, the bottom edge of the plunger drops to a position level with the end of the bore when in closed position, and hence there is no product remaining in the discharge duct to drop off or melt and cause drippage.

All of the above advantages are obtained with a structure which is simple and economical to manufacture and maintain. The materials used are compatible with all health laws, and facilitate sterilization.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a machine for freezing and dispensing soft ice cream, of the type having a steel freezing cylinder, a rotatable dasher within the freezing cylinder, and a front plate formed with a discharge port, the improvement which comprises:
   a head plate formed with a circular groove which fits closely over the front end of the freezing cylinder;
   means to clamp the head plate against the end of the freezing cylinder to form a liquid tight joint;
   a vertical column of substantially the same height as the head plate and secured to the outside of the head plate and formed with a bore;
   a plunger fitting closely in the bore and provided with an operating handle;
   the vertical column being formed with a slot cut down from the top of the column and which accommodates the operating handle;
   the head plate being formed with a discharge port which communicates with the interior of the freezing cylinder and with the bore of the vertical column;
   the head plate, vertical column and plunger being all made of plastic;
   an electrical switch located directly above the plunger to control operation of the rotatable dasher;
   the parts being so constructed and arranged that when the plunger is in its lower position it cuts off exit of ice cream from the discharge port, and when the plunger is in its upper position the discharge port is open and the electrical switch is operated to start the dasher.

2. In a machine for freezing and dispensing soft ice cream, of the type having a steel freezing cylinder, a rotatable dasher within the freezing cylinder, and a front plate formed with a discharge port, the improvement which comprises:
   a head plate formed with a circular groove which fits closely over the front end of the freezing cylinder;
   the head plate being at a right-angle to the axis of rotation of the dasher, and is formed with a discharge port which, as it passes outwardly through the head plate is inclined in the direction in which the dasher is rotated;
   means to clamp the head plate against the end of the freezing cylinder to form a liquid tight joint;
   a vertical column of substantially the same height as the head plate and secured to the outside of the head plate and formed with a bore;
   a plunger fitting closely in the bore and provided with an operating handle;
   the vertical column being formed with a slot cut down from the top of the column and which accommodates the operating handle;
   the head plate being formed with a discharge port which communicates with the interior of the freezing cylinder and with the bore of the vertical column;
   the parts being so constructed and arranged that when the plunger is in its lower position it cuts off exit of ice cream from the discharge port.

3. A device as claimed in claim 2 in which the head ring and head plate are formed of plastic.

4. A device as claimed in claim 2 in which the head ring is made of blue plastic and the head plate is formed of clear plastic.

5. In a machine for freezing and dispensing soft ice cream, of the type having a steel freezing cylinder, a rotatable dasher within the freezing cylinder, and a front plate formed with a discharge port, the improvement which comprises:
   the dasher having at one end a discharge disc and at the other end an end piece;
   a solid rod extending between and rigidly connected to the discharge disc and the end piece on one side of the dasher;
   a tubular rod extending between and rigidly connected to the discharge disc and the end piece on the opposite side of the dasher;
   and the dasher having a single scraper blade removably mounted on the dasher adjacent to the tubular rod
   the parts being so constructed and arranged that the combined weight of the scraper blade and the tubular rod substantially equals the weight of the solid rod to balance the dasher.

6. A device as claimed in claim 5 in which the solid rod and the tubular rod are the sole means which unite the discharge disc and the end piece into a unitary assembly.

7. A device as claimed in claim 5 in which the scraper blade carries a plurality of inclined vanes which serve to move the frozen ice cream toward the discharge end of the freezing cylinder.

8. A device as claimed in claim 5 in which the discharge disc and end piece are formed with slots to receive the scraper blade, and the slot in the end piece has a pin which cooperates with a slot in the scraper blade to insure proper positioning of the scraper blade.

9. In a machine for freezing and dispensing soft ice cream, of the type having a steel freezing cylinder, a rotatable dasher within the freezing cylinder, and a front plate formed with a discharge port, the improvement which comprises:
- a support member on which the front end of the freezing cylinder is mounted;
- the front end of the freezing cylinder being formed as a thin circular collar which projects through an opening in the support member;
- a flat washer-like head ring which surrounds the circular collar and is clamped against the support member;
- a flat head plate formed with a circular groove which receives the end of the circular collar;
- means to clamp the head plate in a position engaging the end of the circular collar but spaced from the head ring;
- the head plate being formed with a discharge port leading from the freezing cylinder;
- and a rotatable dasher having parts formed and arranged to press the frozen ice cream into the discharge passage.

10. A device as claimed in claim 9 in which the head ring and head plate are formed of insulating plastic.

11. In a machine for freezing and dispensing soft ice cream, of the type having a steel freezing cylinder, a rotatable dasher within the freezing cylinder, and a front plate formed with a discharge port, the improvement which comprises:
- a support member on which the front end of the freezing cylinder is mounted;
- a flange secured to the freezing cylinder and extending behind the support member;
- a head ring mounted in front of the support member;
- a plurality of bolts having their heads on the inside of the flange and extending through the flange, the support member, and the head ring;
- nuts sunken in the head ring and engaging said bolts to secure the flange and the head ring to the support member;
- the front end of the freezing cylinder projecting through and beyond the head ring;
- a head plate formed with a circular groove which fits closely over the front end of the freezing cylinder;
- said bolts extending through the head plate;
- and thumb nuts engaged over said bolts and serving to clamp the head plate to a position in which it forms a liquid-tight seal against the end of the freezing cylinder but is spaced from the head ring.

References Cited in the file of this patent

UNITED STATES PATENTS

| | | |
|---|---|---|
| 2,233,975 | Epperson | Mar. 4, 1941 |
| 2,243,317 | Phelan | May 27, 1941 |
| 2,280,434 | Huber | Apr. 21, 1942 |
| 2,358,756 | Zoller | Sept. 19, 1944 |
| 2,587,127 | Erickson | Feb. 26, 1952 |
| 2,645,911 | Martin | July 21, 1953 |
| 2,737,024 | Swenson | Mar. 6, 1956 |
| 2,746,730 | Swenson | May 22, 1956 |
| 2,916,044 | Phelan | Dec. 8, 1959 |

FOREIGN PATENTS

| | | |
|---|---|---|
| 824,638 | Germany | Dec. 13, 1951 |
| 825,844 | Germany | Dec. 20, 1951 |